United States Patent
Vaughen

(10) Patent No.: US 10,161,114 B2
(45) Date of Patent: Dec. 25, 2018

(54) FRESH WATER GENERATION SYSTEM USING COASTAL ATMOSPHERE AND OCEAN WATER

(71) Applicant: Stephen K. Vaughen, Simi Valley, CA (US)

(72) Inventor: Stephen K. Vaughen, Simi Valley, CA (US)

( * ) Notice: Subject to any disclaimer, the term of this patent is extended or adjusted under 35 U.S.C. 154(b) by 497 days.

(21) Appl. No.: 14/881,776

(22) Filed: Oct. 13, 2015

(65) Prior Publication Data
US 2017/0101764 A1   Apr. 13, 2017

(51) Int. Cl.
| | |
|---|---|
| *E03B 3/28* | (2006.01) |
| *C02F 1/00* | (2006.01) |
| *B01D 5/00* | (2006.01) |
| *F28D 1/02* | (2006.01) |
| *F28F 17/00* | (2006.01) |
| *E02B 15/00* | (2006.01) |

(52) U.S. Cl.
CPC .............. *E03B 3/28* (2013.01); *B01D 5/0003* (2013.01); *F28D 1/022* (2013.01); *F28F 17/005* (2013.01); *Y02A 20/109* (2018.01); *Y02A 20/128* (2018.01)

(58) Field of Classification Search
CPC ........ B01D 5/0003; B01D 5/00; B01D 61/10; E02B 15/00; E02B 15/04; E02B 15/06; E02B 15/08; E02B 15/10; E03B 3/28; E21B 43/0122; E21B 43/101; C02F 1/00; C02F 1/22; C02F 1/441; C02F 2103/007; C02F 2103/08
See application file for complete search history.

(56) References Cited

U.S. PATENT DOCUMENTS

| | | | | |
|---|---|---|---|---|
| 4,363,703 | A * | 12/1982 | ElDifrawi | .............. B01D 3/346 203/10 |
| 2004/0000165 | A1* | 1/2004 | Max | ..................... B01D 5/0042 62/615 |
| 2005/0189209 | A1* | 9/2005 | Craven | .................. B01D 3/346 203/10 |
| 2016/0369646 | A1* | 12/2016 | Hendrix | ................ F03D 3/0427 |

OTHER PUBLICATIONS

Bolonkin (Extraction of Freshwater and Energy from Atmosphere, Extraction Water, Apr. 12, 2007, 14 pages).*

* cited by examiner

*Primary Examiner* — Hayden Brewster

(57) ABSTRACT

This invention is designed to create potentially unlimited commercial fresh water at a significantly reduced cost in relation to existing fresh water creation systems such as sea water desalination. This invention pumps coastal atmospheric air through sealed pipes to ocean water depths (ideally) of approximately 100-305 meters, or (ideally) into the local ocean's thermocline layer. Fresh water condensation occurs inside the sealed air pipes as cold ocean water chills the outside of the pipes. Condensation fresh water flows via gravity to the low point in the sealed air pipes where a powered fresh water pump is located. This powered fresh water pump then pumps the accumulated condensation water to the ocean surface and then on to shore as usable fresh water. The pumped-in air, now dehumidified, is piped to the surface and returned to the atmosphere.

1 Claim, 2 Drawing Sheets

FRESH WATER GENERATION SYSTEM USING COASTAL ATMOSPHERE AND OCEAN WATER

FIELD OF THE INVENTION

Creation of fresh water
Municipal water supply generation
Irrigation water generation
Clean fresh water generation
Sea water desalination (related)

BACKGROUND OF THE INVENTION

Many States, municipalities and entire countries are facing dangerous shortages of fresh water for human consumption and irrigation. Natural river water, lakes, as well as finite aquifer resources are beginning to become inadequate or depleted by populations worldwide. Drought conditions and population growth are beginning to create fresh water shortages worldwide. Entire communities are beginning to consume saline water as sea water floods fresh water depleted coastal aquifers. Fresh water shortages have forced farm land to either not be used, or to be destroyed by irrigation with saline contaminated ground water.

Desalination of sea water does in fact produce fresh water, however desalination technologies produce fresh water at a high cost per unit of fresh water produced. Desalination of sea water is NOT an affordable option for many populations worldwide.

The world is in need of a new solution for cost effective and abundant fresh water production for human consumption and irrigation.

Other solutions for fresh water creation including related technologies of sea water desalination:
Distillation
Multi-stage flash distillation
ION exchange
Membrane processes
Reverse osmosis filtration of sea water
Graphene sheet filtration of sea water
Electro dialysis reversal
Geothermal desalination
Solar desalination
Solar humidification-dehumidification
Methane Hydrate crystallization
Ambient air/water condensation using commercial refrigerant, such as dehumidifiers and air conditioners
Ambient air/water condensation using cold ground wells or caves
Systems that pump deep sea water to the surface to use the cold deep ocean water to affect ambient air condensation at the ocean surface Shortcomings of desalination of sea water through distillation or filtration: High cost of fresh water produced is the primary shortcoming of desalination. Energy costs, capital outlays and scalability must all be considered, amortized and evaluated as the cost of the fresh water produced by any system.

Advantage of this invention, ELIMINATION of the energy required to distill or filter sea water.

Another solution (water condensation from ambient air) pumps cold deep sea water to the ocean surface to affect fresh water condensation from ambient air.

Shortcoming of this scheme are: 1. Sea water pipes will clog up over time with sea life such as barnacles. 2. The cost of pumping deep sea water to the ocean surface would make the fresh water production of such a system expensive if not cost prohibitive.

Advantages to this invention are: 1. This invention pumps atmospheric air to ocean depths in sealed pipes such that the barnacle/sea life clogging issue stays on the outside of the pipes thus not clogging the pipes. 2. There is an enormous energy ADVANTAGE to pumping atmospheric air DOWN to the ocean water depths (to affect condensation) as opposed to pumping deep cold ocean water UP to the ocean surface to affect condensation. 3. This invention is designed to compress atmospheric air being pumped into the system to create more complete condensation even in more shallow ocean water depths. Systems that pump UP cold deep ocean water would not inherently have this "air compression for condensation" advantage, or be able to take advantage of more shallow ocean water. Systems that pump cold deep sea water to the surface would be restricted to pumping ONLY the very deep ocean water because that is where the necessary cold water is located. The condensation fresh water produced by such a system would be considerably more expensive per unit than the condensation fresh water produced by this invention.

Another solution to create condensation fresh water from ambient air uses commercial refrigerant to create condensation.

Shortcoming of this scheme: The cost of refrigeration must be factored into the cost of the water the system produces.

Advantage of this invention is the ELIMINATION of the energy cost of refrigeration, thus reducing the cost per unit of fresh water produced.

Another solution uses cold deep earth wells or caves to cause condensation of ambient air. That system envisions using windmills to pump ambient air to deep earth wells/caves to affect condensation.

Shortcoming of this scheme: HIGH cost per unit of water produced due mainly to initial capital outlays to drill earth wells or to construct/utilize suitable caves, to construct windmills. In question is if commercial quantities of fresh water could be produced using this scheme, cost effectively.

SUMMARY OF THE INVENTION

This invention is designed to create fresh water for municipal and irrigation use. Commercial air pumping devices are used to pump coastal atmosphere through sealed (most likely stainless steel) pipes to ocean depths ideally into the ocean thermocline layer. The thermocline layer of sea water is a relatively cold layer of sea water just below the warmer surface ocean layer. Optimal efficiency of this invention will occur if coastal atmospheric air is piped to below the surface ocean layer and into the upper level of the thermocline ocean layer. (Local thermocline ocean depth would need to be determined for each prospective system location.) The thermocline layer depth varies with location, but the upper thermocline layer typically can range from 100 meters to 305 meters depth. Condensation surfaces will be chilled by the relatively cold thermocline ocean water. This invention is designed to utilize the natural downward coastal sea slope such that condensation water flows via gravity to the low point in the pumped-in air pipes. A powered fresh water pump is located at the low point in the air pipes where condensation fresh water accumulates. The powered fresh water pump then pumps the accumulated condensation fresh water to the surface of the ocean and on to shore as usable fresh water. The air pipe makes a 180 degree reversal at the low point (low ocean depth) of the system and returns the dehumidified air back to the atmosphere. An important aspect of this invention is that there is an air flow restriction in the return air pipe to create hesitation of the pumped-in air and to create a certain amount of compression of the pumped-in air. Compression and hesitation of the pumped-in air will facilitate more complete fresh water condensation (condensation even in somewhat warmer, or less than optimal ocean water temperatures and depths) as well as to mitigate the prospect of condensation water re-evaporation due to fast moving air, and to mitigate the prospect of fresh water being blown back up the return air pipe.

Warm coastal atmosphere typically contains a fairly high percentage of evaporated water molecules per unit of atmospheric air. Warm coastal air CAN contain as much as 4.24% water molecules along with 95.76% other gas molecules. (A 4.24% water molecule coastal humidity in 30 degree Celsius air would measure at close to 100% humidity on common humidity measuring devices.) Solar evaporation of sea water creates a virtually unlimited supply of coastal humidity fresh water that this invention seeks to harvest. The intent of this invention is to extract that fresh water from the coastal atmosphere INEXPENSIVELY for the benefit of populations and for irrigation worldwide. Thermocline sea water temperatures in coastal oceans are typically cold enough to create condensation within the system's air delivery pipes, BUT, system air compression should make for almost total humidity extraction from pumped-in air. Natural coastal thermocline sea water becomes the perfect heat sink for condensing fresh water from the coastal atmosphere, and for removing the system heat of air compression. For practical purposes, there is naturally an unlimited amount of coastal atmospheric humidity (at various percentages) AND there is an unlimited ability to condense out that atmospheric humidity as fresh water using ocean water as a heat sink and this invention.

This invention can be made scalable using parallel components to accommodate changing environmental variables, as well as to accommodate changes in municipal and irrigation water demands.

An important advantage of this invention is that there is NO energy requirement to filter for example salt molecules out of sea water, or for example there is NO energy requirement to distill sea water.

In theory, this invention could even produce fresh water for the benefit of some of the driest deserts on earth. The reason is that along the ocean coastlines of many of the world's deserts there is a measurable "inversion layer" of humid atmosphere. Many desert and non-desert regions worldwide have the measurable coastal humidity necessary for the practical functioning of this invention.

It is important to note that this invention envisions utilizing as fuel (though not completely necessary) the world's highly available natural gas and LNG (Liquefied Natural Gas). Technological advances to include shale gas fracking and deep offshore oil and gas drilling have made natural gas an abundant and inexpensive energy commodity worldwide. It should be noted that coastal areas worldwide are ideally located to receive ship deliveries of LNG (Liquefied Natural Gas) as fuel for this invention. Coastal locations are also the proper location for the general functioning of this invention in the creation of fresh water. Many regions such as Texas, California and the Persian Gulf countries are in need of new fresh water supplies, have the necessary ocean coastlines for the functioning of this invention, and have the natural gas resources to fuel this invention for the creation of fresh water.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

FIG. 1 and FIG. 2

Figure 1:
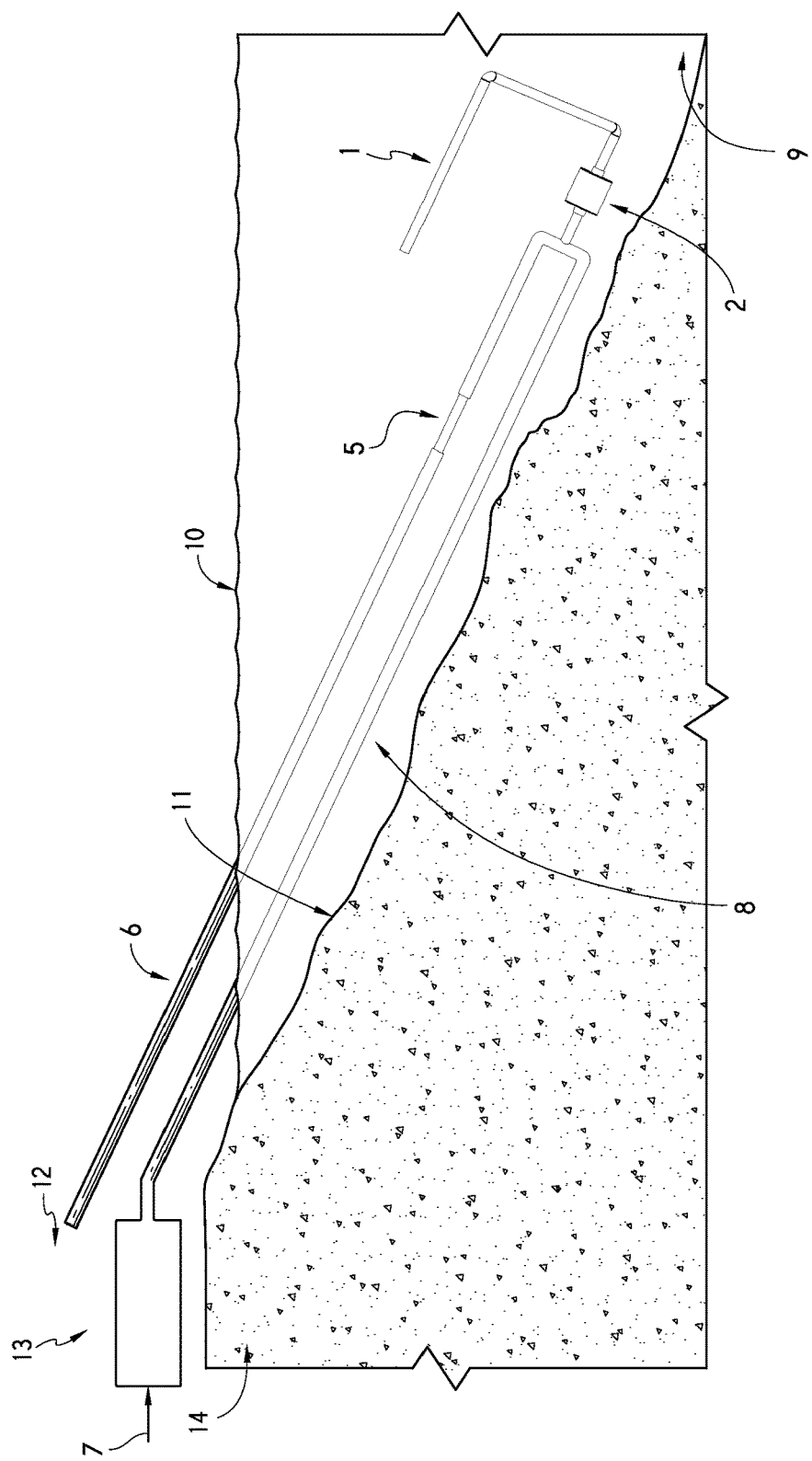
FIG. 1 is a right perspective view of an overall system.
Figure 2:
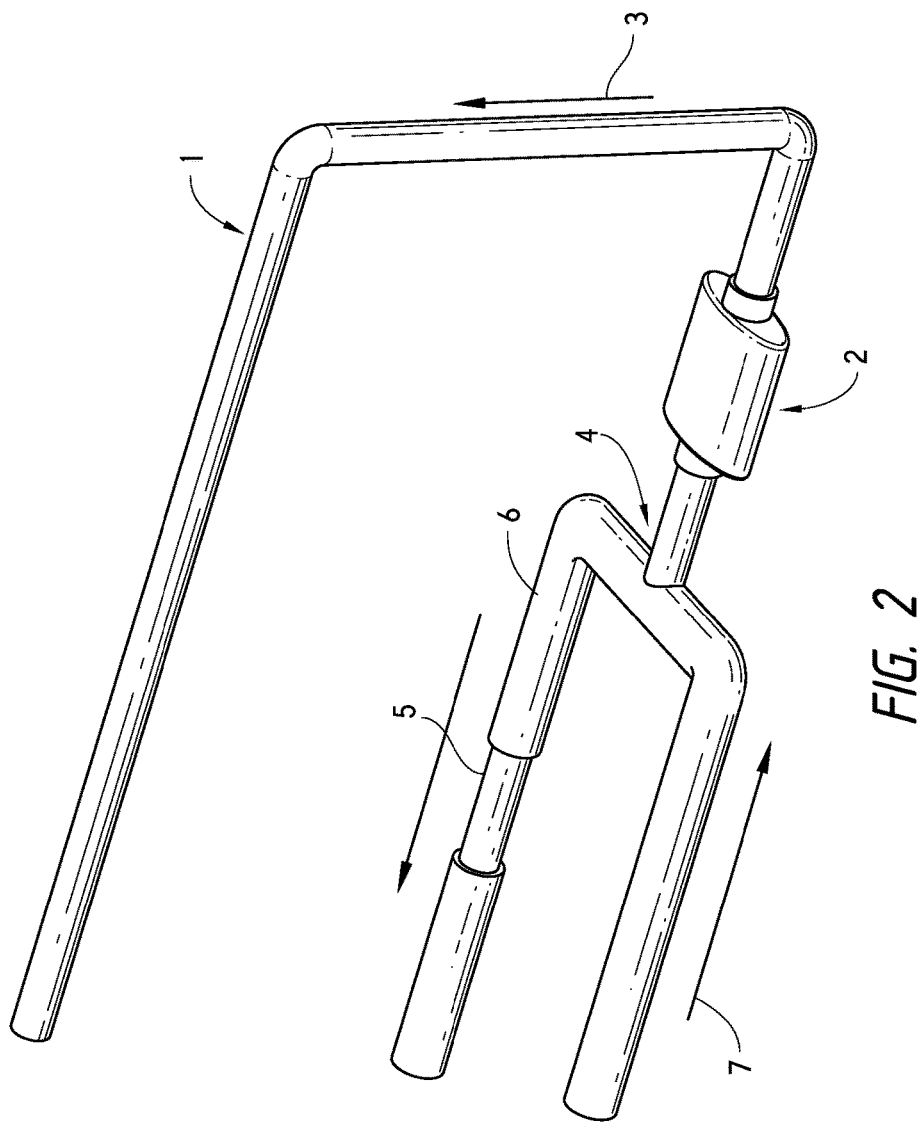
FIG. 2 is a bottom detail view of a fresh water accumulation low point, fresh water pumping detail, pumped-in atmospheric airflow path and airflow restriction.

For maximum system efficiency and to create the lowest cost per unit of fresh water, condensation water accumulation low point 4 should be located within the coastal ocean thermocline layer (depth). 100-305 meters ocean depth is typically the upper limit of the ocean thermocline layer. Pumping coastal air to this depth, ocean depth within thermocline layer 9, is NOT absolutely necessary for the functioning of this invention. This invention uses air compression to affect more complete condensation, therefore shallow warmer ocean waters will still produce condensation fresh water. Pumping air to the colder ocean thermocline layer would create significantly greater efficiencies in the production of condensation fresh water. Warmer sea water would require more compression of pumped in air in order for comparable fresh water condensation to be produced. The additional air pumping energy (while using more shallow warmer ocean depths) would raise the cost per unit of fresh water per unit output, but may in fact be a practical arrangement depending upon location conditions.

fresh water pump 2 This pump should be an electrically powered water pump capable of pumping fresh water to a vertical lift exceeding the depth of the local ocean thermocline upper level, typically 100-305 meters water lift/depth.

Important: For drawing simplicity, fresh water pump 2 is shown as just one pump lifting the fresh water condensation production to the surface of ocean 10 and on to dry land 14. A more practical arrangement would be a series of electrically powered marine water pumps, IN LINE, one after another lifting the fresh water production to the surface of ocean 10 and on to dry land 14. Envision a parallel group of smaller marine water pumps, each pump capable of lifting water for example 20 meters. This parallel group of smaller water pumps would lift the fresh water 20 meters to ANOTHER parallel group of marine water pumps IN LINE which in turn would lift the fresh water another 20 meters, again and again up to the surface of ocean 10 and then on to dry land 14. Many practical issues would be solved using this arrangement to include: 1. Use of "off the shelf" (readily available) electric marine water pumps in groups selected to provide reduced cost and increased component availability. 2. Ability to use marine water pumps rated for less water lift, but higher water flow. 3. Scalability of system to respond to changing environmental and water demand variables. 4. Pump redundancy to deal with the prospect of individual pump failure.

fresh water pump 2 will pump to the surface of ocean 10 and then to dry land 14 the entire fresh water condensation accumulation within the system. fresh water pump 2 must be capable of pumping more, or at least the calculated volume total of fresh water potential condensation of the pumped-in air by the air pumping facility 13. This fresh water pump 2 is located just below the condensation water accumulation low point 4 and is fed with fresh water condensation via gravity from, airflow delivery and condensation pipe 8, from airflow return to atmosphere pipe 6, as well as from condensation occurring within condensation water accumulation low point 4. fresh water pump 2 must operate and run continuously in ocean water (perhaps as deep as 305 meters ocean depth) an ocean depth within thermocline layer 9.

Humidity of coastal atmosphere can be as high as 4.24% water molecules to 95.76% other gas molecules. (4.24% water molecules per volume of atmospheric air at 30 degrees Celsius would measure at approximately 100% humidity using common humidity measuring devices.) The atmospheric humidity will almost completely condense as fresh water onto the walls of the system's air pipes, therefore the rated pumping capacity of fresh water pump 2 must meet or exceed the calculated condensation water potential that the air pumping facility 13 is capable of pumping into the system.

The functioning of this invention utilizes the natural downward slope of the coastal sea bed 11 such that condensation fresh water flows via gravity to the condensation water accumulation low point 4. The accumulated condensation fresh water must be pumped out to the surface by fresh water pump 2, up through the fresh water pipe 1 along the path of direction fresh water pumped to surface 3.

airflow restriction 5 This is a section of pipe narrowing the inside diameter of the airflow return to atmosphere pipe 6 to slow the airflow, but not to completely stop the airflow. This design feature is to slow the airflow and to create some pressure and hesitation in the pumped-in air. Atmospheric air pumped into the system by the air pumping facility 13 will travel down the airflow delivery and condensation pipe 8, around the bend of the condensation water accumulation low point 4, then back up the airflow return to atmosphere pipe 6. Part way up the airflow return to atmosphere pipe 6, there will be an airflow restriction 5. Because system air will be compressed somewhat, then cooled by sea water, condensation will take place even if ocean temperature is perhaps warmer than optimal. Airflow hesitation will mitigate evaporation fresh water loss due to the inherent high velocity airflow in the system's air pipes. Airflow hesitation will also mitigate the risk of condensation fresh water being blown back up the airflow return to atmosphere pipe 6.

fresh water pipe 1 This pipe delivers the fresh water condensation that is produced by the system to the surface of ocean 10, then to dry land 14 for practical use. fresh water pipe 1 should be a stainless steel pipe to reduce or eliminate sea water and fresh water corrosion and to have the necessary strength to operate in the calculated ocean water pressures. fresh water pipe 1 must also have the strength to handle the pumping pressures of fresh water being pumped to surface of ocean 10.

Stainless steel pipe is the best material for airflow delivery and condensation pipe 8 to reduce or eliminate fresh water and sea water corrosion, to handle ocean water pressures at calculated ocean depths, and to efficiently conduct the heat from the pumped in air to the cold sea water on the outside of the airflow delivery and condensation pipe 8, thus facilitating fresh water condensation.

Important: For drawing simplicity, condensation water accumulation low point 4 is shown as a pipe with the SAME DIAMETER as the air pipes it attaches to. A more practical arrangement would be for the condensation water accumulation low point 4 to be a considerably LARGER diameter pipe than the air pipes it attaches to. A larger diameter condensation water accumulation low point 4 pipe would allow for greater condensation fresh water accumulation AND for that fresh water accumulation to NOT restrict the airflow within the system.

air pumping facility 13 This facility should be located on dry land 14, close to the surface of ocean 10 and ideally located next to a fairly steep drop off of the coastal sea bed 11. Ideally, for system efficiency and initial capital reasons, adjacent ocean water depth should reach thermocline depth at a fairly close distance from shore. air pumping facility 13 pumps atmospheric air, direction of air flow 7, directly into airflow delivery and condensation pipe 8. Commercial natural gas powered turbines running air compressor components would be the most practical and efficient arrangement for the air pumping facility 13. Humidity along the sea shore tends to be higher, in some regions considerably higher, than atmospheric humidity inland. For this reason, air pumping facility 13 should draw atmospheric air from directly along the sea shore or perhaps from some distance offshore.

Important: For drawing simplicity, air pumping facility 13 is shown as just one pump. A more practical arrangement would be a parallel grouping or "array" of natural gas powered turbines running air compressor components. A cost benefit analysis would most likely reveal that an array of smaller gas turbines in parallel pumping air into airflow delivery and condensation pipe 8 would be more cost effective than one huge turbine as shown in the drawings.

High pressure air injection would have a number of invention/system benefits: 1. Condensation fresh water would form in warmer more shallow ocean depths. 2. The ability to pump large volumes of air more efficiently over longer distances which may be required to reach the thermocline depth of the coastal ocean. (Efficiently moving air over long distances is similar to moving electricity over long distances. The higher the air pressure, or electricity voltage, the more efficient the movement of either air or electricity.)

Though not absolutely necessary, the air pumping facility 13 should probably be designed to include natural gas powered electricity generation to run the fresh water pump 2. (More likely electric marine water pumps, in line.) Ideally, natural gas would be the energy source for the air pumping facility 13 AND natural gas would fuel electricity generators to power the fresh water pump 2. As a complete system, with knowledge of the local coastal atmospheric humidity levels, cost per unit of fresh water output could be determined.

It is important to locate this point, dehumidified air is returned to the atmosphere 12, some distance isolated, down wind from, the air pumping facility 13. Without isolation, the risk exists of system dehumidified air being sucked back in by the air pumping facility 13 thus defeating the system of fresh water condensation.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A fresh water generation system using coastal atmosphere and ocean or sea water for creating cost effective fresh water for municipal water supplies and irrigation, said system consisting of:
- an airflow and condensation pipe for delivering atmospheric air from an ocean shoreline to an ocean depth, returning dehumidified air back to the atmosphere and allowing condensed fresh water to flow to a low point in the system, said airflow and condensation pipe including a reversal at said ocean depth for delivering dehumidified air from the ocean depth to the ocean shoreline,
- said airflow and condensation pipe further including a narrow part or airflow restriction after said reversal of said airflow and condensation pipe, with a diameter lesser than the diameter of said airflow and condensation pipe, to slowdown the flow of dehumidified air from the ocean depth to the ocean shoreline, thereby creating airflow hesitation and compression and an air pressure difference compared to the shoreline atmospheric air;
- an air pumping facility or at least one pump connected to said airflow and condensation pipe, for pumping atmospheric air into said airflow and condensation pipe and for delivering said atmospheric air from said ocean shoreline to said ocean depth;
- a condensed water flow pipe connected to said airflow and condensation pipe at said reversal, and extending in a downward direction to enable flow of condensed water away from said airflow and condensation pipe;
- at least one fresh water pump connected to said condensed water flow pipe to receive condensed water accumulated in the airflow and condensation pipe at said reversal and to pump accumulated condensed fresh water to the ocean surface; and
- a fresh water pipe connected to said at least one fresh water pump and structured to receive condensed water pumped by said at least one fresh water pump into said fresh water pipe, for delivering condensed water above ocean water surface,
- wherein said airflow and condensation pipe is structured on a coastal sea bed, to enable flow of condensed water from atmospheric air travelling towards said reversal of said airflow and condensation pipe, thereby accumulating condensed water at the reversal of said airflow and condensation pipe,
- wherein said air pumping facility or at least one pump is structured near an ocean or sea and a steep drop off of said coastal sea bed.

* * * * *